United States Patent [19]

Böhm

[11] 4,089,360
[45] May 16, 1978

[54] PNEUMATIC TIRE CONTAINING AN IRRADIATED LAMINATED COMPONENT

[75] Inventor: Georg Gustav Anton Böhm, Akron, Ohio

[73] Assignee: The Firestone Tire & Rubber Company, Akron, Ohio

[21] Appl. No.: 615,266

[22] Filed: Sep. 22, 1975

[51] Int. Cl.² .................. B60C 5/00; B29H 17/08
[52] U.S. Cl. ........................ 152/330 R; 152/347;
   156/123 A; 156/135; 156/272; 428/156;
   428/212; 428/213; 428/217; 428/345; 428/493;
   428/515
[58] Field of Search .......... 428/212, 217, 345, 493,
   428/515, 519, 520, 156, 157, 213, 517; 156/272,
   123, 135

[56] References Cited

U.S. PATENT DOCUMENTS

| | | | |
|---|---|---|---|
| 2,888,058 | 5/1959 | Manis et al. | 156/135 X |
| 2,979,111 | 4/1961 | Schutz | 156/135 X |
| 2,996,099 | 8/1961 | McCall | 156/135 |
| 3,669,824 | 6/1972 | Hess | 428/212 |
| 3,933,553 | 6/1976 | Seiberling | 428/212 X |
| 3,933,566 | 1/1976 | Seiberling | 428/212 X |

Primary Examiner—William R. Dixon, Jr.

[57] ABSTRACT

This disclosure relates to a laminate of several layers of rubber compounds. The laminate may be in sheet or strip form with various cross-sectional shapes. The layers in the laminate comprise rubber compounds, some of which contain agents which either assist or retard cure by irradiation so that the layers will have different physical characteristics during the manufacture of end products containing the laminate. The laminate may be cured by any known method, either irradiation or thermal, after its assembly into the final product.

6 Claims, 5 Drawing Figures

PNEUMATIC TIRE CONTAINING AN IRRADIATED LAMINATED COMPONENT

BACKGROUND OF THE INVENTION

This invention relates to a laminate composite sheet or strip of rubber compound which is made up of several separate layers of specifically designed rubber compound. The laminate may be made by any of the known methods, such as calendering and the like; however, it is preferred that the laminate be formed by a process known as coextrusion in which two or more rubber compounds passed through the preform die to form separate layers which are joined in the final die. A recent technique for this is disclosed in U.S. Pat. Nos. 3,479,425 and 3,557,265. This coextrusion process has been applied to plastics and thermal plastic elastomers to form laminates thereof.

Laminated articles are known in which the separate layers comprise materials which have different properties. Such articles have been utilized in the manufacture of tires wherein a stiff, partially cured rubber compound has been sandwiched between two layers of soft, tacky, uncured rubber compound by calendering the soft layers onto the already partially cured compound. Strips of this type have been employed in the bead area of the tire, where the tire contacts the rim, as an abrasion gum strip to resist the chafing that takes place between the tire and the rim.

An uncured rubber compound tends to flow during the curing operation, thereby descreasing its effective gauge or thickness. This is particularly true in the bead area and innerliner area of the tire where the curing pressure is high. In the above described type of composite strip the partial precure of the stiff compound enables it to retain its gauge or thickness during the tire curing operation, but the precure renders the strip inherently dry, causing an adhesion problem between it and the other parts of the tire during the building and curing operation. The external layers of the soft, tacky, uncured rubber compund in the laminate help to overcome this deficiency and provide the necessary uncured adhesion so that the composite strip will not separate from the remaining pieces of the tire prior to its final cure. However, there is still an adhesion problem because layers (the external layers) are being adhered to a partially cured layer.

Additionally, these prior composite strips have been difficult and expensive to manufacture. The process has been to calender the inner, stiff strip; subject it to a curing operation in which it is partially cured; and then calender the soft, tacky strips on both sides of the then stiff strip to form the final composite laminate. This operation has been expensive and time consuming in the past and involves several steps. Due to the limitations of the calendering operation, it has also necessitated the use of thicker strips for an adequate safety margin than are necessary to perform the functions in the final product.

The method and product of this invention has greatly simplified and improved the composite strip technology thereby enabling the use of composite strips not only in previous areas, but also in areas which were not feasible prior to this development. Strips employing this invention can be utilized in pneumatic tires as the air impervious liner which covers the inner periphery of the tire or as the abrasion gum strip which is located in the bead area of the tire that comes into contact with the flange of the tire rim when the tire is mounted and inflated.

The technology and invention of this application are not limited to these two places in a pneumatic tire. The technology may be applied to any of several end products, such as conveyor belts and industrial products.

The method and product of the invention are particularly useful where it is necessary to have one material retain a certain thickness in the end product. This has usually been accomplished in the past by using an excess amount of material to insure that the minimum is present in the final product after it has thinned out in the processing steps. The prior partial pre-cure method, although a help, still had this deficiency because only a partial cure could be obtained; a full cure would have rendered the cured stock unusable due to its poor adhesion.

This invention provides an improved laminate by selectively altering some of the layers in the laminate so that the layers will either be partially cured or fully cured when subjected to irradiation or will be uneffected by irradiation and remain uncured.

This technique eliminates at least one of the steps necessary in the prior processes. In this technique the composite strip is obtained by calendering or, preferably, by coextrusion. The rubber compounds in the various layers have been selectively either sensitized or desensitized to react to irradiation in various degrees. The composite strip is then subjected to irradiation wherein the sensitized layer or layers are partially or fully cured and the desensitized layer or layers are unaffected. Alternatively, all the layers may be sensitized to different degrees so that the composite has all of its layers cured to some degree with different layers cured to different degrees. This results in the different layers in the composite having different physical characteristics which may be utilized in the ultimate manufacture of the end product, as the abrasion gum strip application outlined above.

It is an object of this invention to provide a composite strip which can be manufactured in a relatively cheap and uncomplicated manner.

It is a further object of this invention to provide a composite strip in which the thickness of the separate layers is dictated by the amount of the layer necessary to perform its function and not by the problems inherent in the manufacture of the strips.

It is a further object of this invention to provide a composite strip in which some of the layers are sensitized to partially cure or totally cure when subjected to irradiation and other layers are desensitized to be unaffected by irradiation.

It is a further object of this invention to provide a composite strip in which all of the layers are sensitized to partially or totally cure but certain layers are sensitized to different degrees so that the physical characteristics of the layers differs.

These and other objects will be evident from the detailed description of the invention which follows.

SUMMARY OF THE INVENTION

This invention relates to the technology of obtaining a composite laminate of several layers of material and the resulting laminate. It is known that rubber compounds may be sensitized to cure or partially cure when subjected to irradiation. The invention's utilization of this concept is novel in that certain layers of the laminated contain sensitizing materials and other layers desensitizing materials. This results in the composite having cured and uncured layers after it has been subjected to irradiation. This technique enables the production of composite laminates in which predetermined layers have predetermined physical characteristics which are desirable in the manufacture of the ultimate end product.

For example, the innerliner in a pneumatic tire must be sufficiently impervious to air to prevent the air in the inflation chamber from entering into the tire. If the air does enter into the tire, it will expand due to the heat generated during operation and will eventually cause a separation in the tire. The more air impervious materials, for example, the halogenated butyl rubbers, do not possess good building tack and adhesion, are soft, and will thin out in the high pressure areas when the tire is expanded and vulcanized in the vulcanizing process.

It is necessary that the innerliner be sufficiently air impervious and retain its dimensional stability so that it will not thin out in these high pressure areas of the tire yielding an insufficient thickness to effectively stop the air passage into the tire. It is also necessary that the innerliner have sufficient tack to adhere to the adjacent pieces of the tire until the tire is cured. In the past it has been necessary to put an innerliner which is thicker than necessary to effectively stop air passage throughout the entire inner periphery of the tire so that the minimum thickness is maintained in the high pressure areas (the tread shoulders) of the tire. This invention eliminates the necessity for providing the thick innerliner across the entire periphery of the tire. When a profile coextrusion technique is utilized, it is possible to extrude a contoured innerliner in which the thickness is increased in the high pressure areas of the tire without an increase in the thickness in the low pressure areas. This results in a significant savings of material as the minimum amount of material necessary may be utilized across the entire periphery of the innerliner.

This invention also enables the manufacture of an innerliner in which inner layers of the laminate may be designed to give certain characteristics to the overall laminate and the outer layers may be designed to give building adhesion so that separations will not occur prior to the vulcanization of the tire. This is accomplished by having one of the inner layers comprised of a halogenated butyl compound which will give the necessary air impermeability, another inner layer comprised of a polybutadiene rubber compound which provides the stiffness on exposure to irradiation so that it will maintain its dimensional integrity during the vulcanization operation, and an outer layer on both sides which will comprise a natural rubber compound having sufficient tack to adhere to the contiguous components of the tire and to itself in the splice area of the innerliner. The two inner layers are sensitized to cross-link or cure on exposure to irradiation whereas the outer layers are desensitized so that such irradiation treatment does not effect any tacky characteristics. This composite strip can be manufactured at much lower gauges than the prior art strips due to this technique, thereby saving a considerable amount of raw materials and costs.

The same technology is applicable to the abrasion gum strip of a tire. This strip is located in the bead area of the tire and comes into contact with the rim flange during tire operation. It is necessary for this strip to withstand the high abrasion that the tire incurs in this area from the rim flange. This strip must have the necessary characteristics, usually a hard, stiff, high modulus rubber compound, to resist these abrasion forces and must be present in a sufficient thickness to protect the tire. The inherent stiffness and hardness of the abrasion gum strip results in a loss of tack which creates an adhesion problem during the building and curing of the tire. There is a time lag between the tire building operation and the curing operation; it is necessary that the tire parts have sufficient adhesion to each other so that the uncured tire does not come apart during this waiting period or thereafter when it is expanded during the curing operation. Also, the high pressures in the bead area of the tire during the curing operation results in the abrasion gum strip material thinning out in certain areas. These problems are overcome by the technique of this invention. The abrasion gum strip is manufactured by this invention wherein a strip of hard, stiff, high modulus rubber compound is sandwiched between two strips of tacky, soft rubber compound. The hard strip is sensitized to partially or fully cure when subjected to irradiation and the two outer strips are desensitized so that irradiation will not affect their adhesion properties. The strip, so constructed, is subjected to irradiation so that the hard strip is partially or fully cured and will retain its dimensional integrity during the vulcanization of the tire. The two tacky outer strips prevent the separation of the strip from the contiguous layers of the tire and from itself in the splice area.

The two above-identified examples illustrate the technique of this invention. The invention is not limited to these two specific end uses but may be employed in other end products, such as, liners for tanks, hoses and fabric reinforcement for the manufacture of tanks. It is envisioned that composite laminates may be manufactured with layers of different materials depending upon the properties desired and the end use. It is critical to this invention that some of the layers be selectively sensitized or desensitized to react to irradiation treatment to provide these desired properties. Alternatively, all the layers may be sensitized to different degrees, by different levels or types or sensitizing agents, so that the irradiated composite strip will have different physical characteristics in its layers.

Several chemicals have been found useful to accelerate, in varying degrees, the cure of rubber compounds by irradiation and several chemicals have been found useful to decelerate or inhibit the cure of rubber compounds by irradiation. These promoters and retarders are classified as sensitizing or desensitizing agents. The type of rubber utilized in the compound is critical and dictates the type of promoter or retarder that will function. The type of promoter or retarder will vary when different types of rubbers are used in the compound and the amount of these chemicals may vary depending upon the type of rubber used or the dosage (amount) of irradiation which the rubber compound receives.

Specifically, it has determined that paradichlorobenzene (PDCB) is an effective promoter for irradiation cure in rubber compounds. It has also been determined that certain of the thioetherpolythiols are effective promoters. The specific polythiols which have been evaluated and found useful are set out in Table I. Compound 2 identified in this table was utilized in the examples which follow and is designated "TEPT" therein.

TABLE I
POLYTHIOETHER POLYTHIOLS DERIVED FROM TRIENE-DITHIOL OR TRIENE-H$_2$S POLY ADDITIONS

| COMPOUND | THIOL FUNCT. SH EQUIV./GM | IDEALIZED CHEMICAL STRUCTURE AND DERIVATION |
|---|---|---|
| 1 | .0050 | [S(CH$_2$)$_3$SH]$_3$ from cyclodocetriene and 1,3 propane dithiol. |
| 2 | .0082 | S[CH$_2$CH$_2$—⬡—(CH$_2$CH$_2$SH)$_2$]$_2$ from trivinyl cyclohexane and H$_2$S. |
| 3 | .0045 | S[CH$_2$CH$_2$—⬡—(CH$_2$CH$_2$S(CH$_2$)$_2$SH)$_2$]$_2$ from trivinyl cyclohezane and ethanol dithiol. |
| 4 | .0041 | ⬡—[CH$_2$CH$_2$S(CH$_2$)$_4$SH]$_3$ from trivinyl cyclohexane and 1,4 butane dithiol. |
| 5 | .0049 | S[(CH$_2$)$_2$—⬡—((CH$_2$)$_2$—S—(CH$_2$)$_3$SH)$_2$]$_2$ from trivinyl chclohexane and 1,3 propane dithiol |

It has also been determined that effective retarders of irradiation curing or cross-linking include aromatic oils, sulfur, sulfur cure accelerators and some rubber antioxidants and/or antiozonants of the substituted diphenylamine type, such as N-(1,3-dimethylbutyl)N'-phenyl-p-phenylene diamine.

Table II lists some commercial antioxidants/antiozonants which have been found useful as retarders of irradiation cure. A higher swelling ratio indicates more retarding effect. The swelling ratio were obtained by compounding one part of the particular antioxidant into 100 parts of polybutadiene rubber, subjecting the compound to 5 Megarads of irradiation, immersing the sample in toluene for 48 hours at room temperature and measuring the weight of the swollen rubber against the weight of the dry rubber.

TABLE II

| Test | Antioxidant | Chemical Composition | Swelling Ratio |
|---|---|---|---|
| 1 | None | — | 11.5 |
| 2 | DBPC | 2,6-di-t-butyl-para-cresol | 15.1 |
| 3 | Santowhite Crystals | 4,4'thiobis(6-t-butyl-m-cresol) | 13.6 |
| 4 | PBNA | phenyl beta-napthylamine | 14.7 |
| 5 | Agerite White | syn-di-betanaphthyl-p-phenylene diamine | 11.9 |
| 6 | Santoflex 13 | N-(1,3-dimethylbutyl)-N' phenyl-p-phenylene diamine | 27.4 |

The dosage of irradiation which is utilized to accomplish this invention is dependent upon several variables; the type of rubber in the rubber compound, the promoter or retarder utilized in the rubber compound, the level of the promoter or retarder utilized in the rubber compound, the thickness of the layer of material, the thickness of adjacent layers of materials, the sequence of the layers of material, the number of the layers of material and whether the irradiation is applied to one or both sides of the composite strip. The proper combination is obtained to yield the desired physical properties in the composite strip.

The dosage also may be controlled by the amount of energy employed so that the electrons do not completely penetrate the entire strip. This results in the irradiation of part of the strip, but not the entire strip.

DETAILED DESCRIPTION OF THE INVENTION

Figure 1:
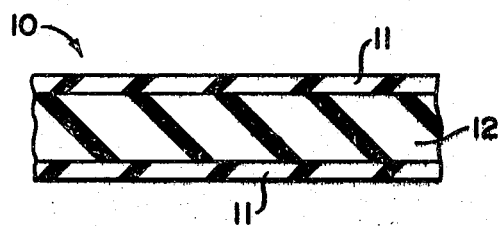
FIG. 1 is a partial cross-section view of this invention as embodied in an abrasion gum strip for tires.

In FIG. 1 the composite laminate is shown generically as 10 having a stiff, sensitized, internal layer, 12, and two desensitized external layers, 11. The internal layer is a rubber compound comprising 100 parts of a solution styrene/butadiene copolymer, 80 parts of a reinforcing carbon black, 4 parts of PDCB and other compounding ingredients excluding sulfur and sulfur curing accelerators. The two external layers, 11, are a rubber compound comprising 100 parts of natural rubber, 45 parts of carbon black and other compounding ingredients, including the following which retard irradiation cross-links; Santoflex 13, Aromatic Oil, Sulfur and Sulfur Cure Accelerators.

In this invention the laminate, 10, after its construction, is subjected to an irradiation treatment which cross-links the layer 12 and does not effect layers 11. The laminate is then placed in the final product and the subsequent processing steps accomplished to yield the final product, including the vulcanization thereof which curves layers 11 and does not degrade layer 12.

In the application of this invention, the composite laminate, 10, may be obtained by calendering or coextrusion. The coextrusion method is preferred as it provides better control of the thickness of the layers at lower gauges, gives better adhesion between the layers and permits the formation of laminates having contours at preselected positions, such as those shown in FIG. 3.

To demonstrate the feasibility of this invention, composite laminates were manufactured having a layer of soft, natural rubber compound comprising 100 parts of natural rubber, 45 parts of carbon black and other compounding ingredients, such as Santoflex 13, aromatic oil, sulfur and sulfur cure accelerators, all of which have a desensitizing effect on irradiation cure, and a layer of a hard, rubber compound comprising 100 parts of a solution styrene/butadiene copolymer, 80 parts of reinforcing carbon black and four parts of PDCB, a sensitizing agent. In this composite laminate the soft, natural rubber compound had a thickness of 0.045 inches (0.1143 cm) and the hard, solution styrene/butadiene compound had a thickness of 0.035 inches (0.0889 cm). These layers were separated by two layers of Mylar and a blue cellophane dosimetry layer to measure the irradiation dosage used. Two identical pairs of composite laminate samples were initially subjected to irradiation on one side and were turned over and subjected to irradiation on the other side; a double side irradiation. After this irradiation step the laminates were disassembled. The layers of one of each pairs of such strips were checked for physical properties (stress-strain data).

These results are set out in Table III under the column "Radiation Cure". The separated layers of the remaining irradiated strips were given an additional thermal cure for 10 minutes at 328° F. in a 0.040 gauge mold and their physical properties were then obtained. These results are reported in Table III under the column "Radiation and Thermal Cure". Three separate tests were run in this manner, each at a different dosage as shown in Table III.

TABLE III

| TEST Rubber Compound | RADIATION CURE | | RADIATION AND THERMAL CURE | |
|---|---|---|---|---|
| | Desensitized Natural Rubber | Sensitized Stereon | Desensitized Natural Rubber | Sensitized Stereon |
| TEST 1 Ave. Dosage 8.6 Megarads | | | | |
| Tensile Strength (psi) | 590 | 2285 | 2860 | 2490 |
| Modulus (psi) at | | | | |
| 100% elongation | 45 | 570 | 285 | 670 |
| 200% elongation | 75 | 1290 | 800 | 1815 |
| 300% elongation | 150 | 2240 | 1590 | — |
| Elongation at Break (%) | 560 | 300 | 445 | 260 |
| TEST 2 Ave. Dosage 11 Megarads | | | | |
| Tensile Strength (psi) | 840 | 2620 | 2985 | 1695 |
| Modulus (psi) at | | | | |
| 100% elongation | 50 | 605 | 260 | 530 |
| 200% elongation | 90 | 1495 | 700 | 1200 |
| 300% elongation | 190 | 2515 | 1435 | — |
| Elongation at Break (%) | 630 | 315 | 460 | 260 |
| TEST 3 Ave. Dosage 12.3 Megarads | | | | |
| Tensile Strength (psi) | 855 | 2440 | 2595 | 2050 |
| Modulus (psi) at | | | | |
| 100% elongation | 55 | 705 | 220 | 610 |
| 200% elongation | 100 | 1745 | 690 | 1425 |
| 300% elongation | 205 | — | 1295 | — |
| Elongation at Break (%) | 595 | 265 | 455 | 265 |

This data clearly demonstrates the feasibility of this invention showing that the sensitized layer is cured by the irradiation step, the desensitized layer is not, the desensitized layer is cured by the subsequent vulcanization step and the sensitized layer is not adversely affected by the subsequent vulcanization step.

Figure 2:
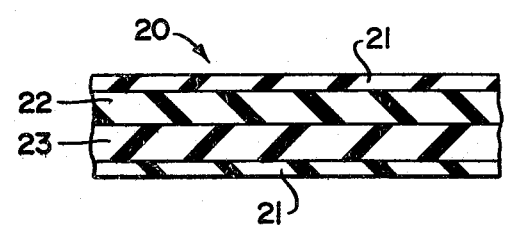
FIG. 2 is a partial cross-section view of this invention as embodied in an innerliner for tires.

In FIG. 2 the composite laminate is shown generically as 20 having two external layers, 21, and two different internal layers, 22 and 23. This embodiment demonstrates the application of this invention to a composite laminate which has at least three separate rubber compounds. The outer layers, 21 comprising a soft rubber compound which is designed to have good building tack, are desensitized against irradiation exposure by, for example, including therein desensitizing agents such as Santoflex 13. Inner layer 22 is a relatively hard rubber compound having a polybutadiene rubber base and reinforced with carbon black. It contains sensitizing agents (such as TEPT) which accelerate crosslinking by irradiation. This compound would be cured when subjected to irradiation so that it would not flow during subsequent processing steps. The compound is designed to retain its thickness in the final product.

The layer 23 is again sensitized to cross-link upon irradiation by, for example, sensitizing agent TEPT. This layer comprises a halogenated butyl rubber base which is air impervious. The layer is designed to retain its shape during the subsequent processing steps and to provide a barrier against air passing from the internal air chamber of a pneumatic tire into the tire body. Again, after its construction this laminate is irradiated and built into the final product which is subjected to subsequent processing steps to complete its manufacture.

This embodiment of the invention is not limited to the layer sequence which is disclosed in FIG. 2. It is envisioned that this embodiment may contain one or more internal strips of various compositions which are designed to meet a specific need for the application of the composite strip. For example, the layer, 22, may be eliminated from the composite laminate if the irradiated cross-link stiffness of the layer, 23, is sufficient to retain the gauge of the layer throughout the subsequent manufacturing steps. Likewise, additional layers may be added to overcome other problems.

Figure 3:
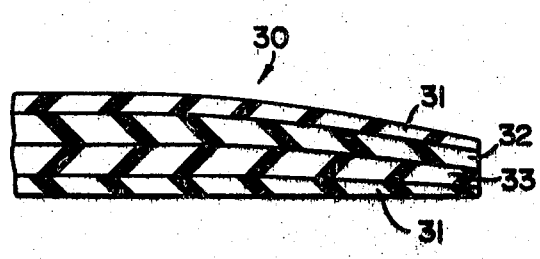
FIG. 3 is a partial cross-section view of this invention as embodied in a contoured innerliner for tires.

FIG. 3 represents another embodiment of the innerliner composite laminate which is shown in FIG. 2. In FIG. 3 the external layers, 31, again comprise a soft rubber compound which is desensitized against irradiation cure and possess good building tack. Layer 32 again is a hard rubber layer which is sensitized to cure when subjected to irradiation. This layer is comprised of a solution polybutadiene rubber and reinforcing carbon black. Layer 33 again is a hard rubber layer comprised of a halogenated butyl rubber and reinforcing carbon black. This layer is the barrier layer which resists the passage of air.

FIG. 3 demonstrates the contoured embodiment of this invention in which the layers, 32 and 33, are thicker in a predetermined area of the tire where the innerliner is subjected to the highest pressure in the shaping and curing operations. In this embodiment the thickness of each layer is maintained in the same proportion to the other layers throughout the entire width of the strip. The excess thickness in this area prevents innerliner thinning out and cord shadowing (body cords actually striking through the thinnedout innerliner) that may occur in this area of the tire. This contoured strip provides the necessary thickness in the troublesome areas without having to retain that thickness across the complete width of the strip as prior laminates have.

Figure 4:
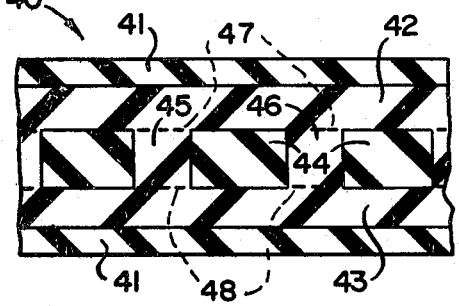
FIG. 4 is a partial cross-sectional view of another embodiment of this invention which is used for a self-sealing innerliner for tires.

FIG. 4 represents another embodiment of an innerliner composite laminate. In FIG. 4 the laminate is designated generically as 40. It contains two outer layers, 41, comprising a soft rubber compound which is designed to have good building tack and is desensitized against irradiation curing by, for example, the inclusion of an antioxidant such as Santoflex 13. Two intermediate layers, 42 and 43, are located inside of layers 41. These layers comprise a hard rubber compound containing halogenated butyl rubber and reinforcing carbon black which have been sensitized to cure on exposure to irradiation, for example, by the inclusion of TEPT. Between layers 42 and 43 is a layer of polyisobutylene, 44, without any sensitizing or desensitizing agents. This material may or may not contain some reinforcing material, such as carbon black. Bridges 45 and 46 of the same material utilized in layers 42 and 43 connect layers 42 and 43 to one another. The junction between layer 42 and bridges 45 and 46 is shown at 47 and the junction between layer 43 and bridges 45 and 46 is shown at 48. These bridges form pockets which contain the layer 44.

When the laminate of FIG. 4 is subjected to irradiation, the layers 41 will be unaffected and will remain soft and tacky to provide adhesion during the subsequent processing steps for the end product. The layers 42 and 43 will partially or fully cure thereby providing a stiff, hard foundation for the composite laminate. The material in layer 44 will be degraded by chain scission and will form a liquid, pasty material. This composite can then be applied as the innerliner of a tire and subjected to the later vulcanization step. The resulting tire will have an innerliner which contains pockets of the liquid polyisobutylene material. This material will act as a sealant to any punctures which may occur in the tire thereby giving the tire a self-sealing capability. The bridges 45 and 46 are necessary to maintain the integrity of the composite laminate after the irradiation step due to the fact that the layer 44 is liquified by the irradiation step.

The laminate of FIG. 4 is feasible because irradiation causes chain scission in the polyisobutylene while the cross-linking which occurs will not balance the degradation due to this chain scission reaction in this material. Standard butyl rubber, a copolymer of polyisobutylene and isoprene, is degraded to a certain degree by irradiation but this degradation is compensated by a concurrent cross-linking reaction. The same two compensating reactions occur in halogenated butyl rubbers except the cross-linking reaction is more predominant in the halogenated butyl than it is in the standard butyl. This performance of the butyl rubbers demonstrates the critical nature of the irradiation treatment and the criticality of selecting the proper sensitizing or desensitizing agents for each specific rubber.

It is envisioned that this chain-scission versus cross-linking situations may also be employed in a three layer laminate in which the two outer layers are soft, tacky rubber compounds desensitized to resist irradiation cure and the inner layer contains a blend of polymers, such as polyisobutylene and halogenated butyl rubber. Upon irradiation the polyisobutylene will degrade and form a liquid which will be trapped in the cross-linked halogenated butyl rubber. This composite would have self-sealing characteristics.

Figure 5:
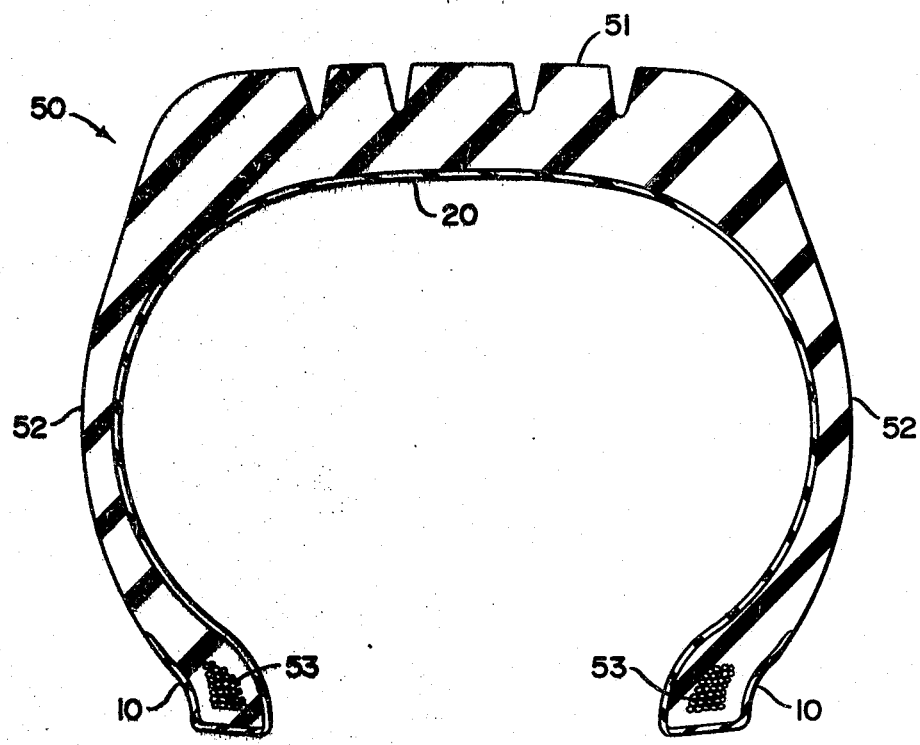
FIG. 5 is a cross-sectional view of a tire embodying this invention as an abrasion gum strip and an innerliner.

FIG. 5 represents a tire containing this invention. The tire is shown generically as 50 having tread 51, sidewalls, 52, and beads, 53. The abrasion gum strip described in FIG. 1, 10, is placed in the bead area of the tire where the tire contacts the rim. The innerliner described in FIG. 2, 20, is placed on the inner periphery of the tire. The other feature of the tire may be any of the known constructions (radial, bias, belted-bias) for passenger, truck, airplane, off-the-road, tractor or industrial tires.

Table IV demonstrates the sensitizing the desensitizing characteristics of several chemicals on a rubber compound of the following basic formula:

Solution styrene/butadiene copolymer (SBR) — 100 parts

Reinforcing furnace black (CB) — 50 parts

Each comparison is listed under a test number; the first column defines the ingredients in the above basic formula, the second column the modulus at different elongations and the last the average irradiation dosage to which each compound was exposed. In the tests the two compounds were laminated together and irradiated; the compounds were then separated and the physical properties of each determined.

TABLE IV

| | Modulus at Elongation | | | Dosage Ave. |
|---|---|---|---|---|
| | 100% | 200% | 300% | Megarads |
| Test 1 | | | | |
| SBR/CB | 187 | — | — | 7.3 |
| SBR/CB + 3.5 TEPT* | 1004 | — | — | 7.2 |
| Test 2 | | | | |
| SBR/CB + 3.5 TEPT | 889 | — | — | 7.6 |
| SBR/CB + 3.5 Santoflex 13 | 127 | — | — | 7.2 |
| Test 3 | | | | |
| SBR/CB | 219 | 325 | — | 6.9 |
| SBR/CB + 1.5 TEPT, 2 PDCB** | 632 | 1824 | — | 7.1 |
| Test 4 | | | | |
| SBR/CB + 3.5 Santoflex 13 | 178 | 213 | — | 6.9 |
| SBR/CB + 1.5 TEPT, 2 PDCB | 623 | 1706 | — | 6.9 |
| Test 5 | | | | |
| SBR/CB + 1.5 TEPT, 2 PDCB, 30 naphthenic oil*** | 235 | 683 | 1447 | 8.3 |
| SBR/CB+ 3.5 Santoflex 13, 30 aromatic oil**** | 48 | 57 | 68 | 8.0 |
| Test 6 | | | | |
| SBR/CB + 1.5 TEPT, 2 PDCB, 20 naphthenic oil | 315 | 1090 | — | 10.1 |
| SBR/CB + 3.5 Santoflex 13, 20 aromatic oil | 68 | 85 | — | 10.1 |
| Test 7 | | | | |
| SBR/CB + 1.5 TEPT, 2 PDCB, 10 naphthenic oil | 405 | 1165 | 2267 | 7.8 |
| SBR/CB + 3.5 Santoflex 13, 10 aromatic oil | 88 | 110 | 145 | 7.6 |
| Test 8 | | | | |
| SBR/CB + 1.5 TEPT, 2 PDCB, 20 naphthenic oil | 325 | 1033 | — | 9.6 |
| SBR/CB + 3.5 Santoflex 13, 20 aromatic oil | 55 | 55 | — | 3.5 |
| Test 9 | | | | |
| SBR/CB + 20 Naphthenic oil | 141 | 302 | 702 | 9.9 |
| SBR/CB + 20 Aromatic oil | 75 | 101 | 143 | 10.0 |
| Test 10 | | | | |
| SBR/CB + 3.5 TEPT | 293 | 963 | 1793 | 8.3 |
| SBR/CB + 3.5 Santoflex 13, 20 Aromatic oil | 57 | 72 | 92 | 8.2 |

*TEPT = Thioetherpolythiol (compound 2 in Table 1)
**PDCB = p-dichlorobenzene
***naphthenic oil = Sunthene 4240
****aromatic oil = Dutrex 726

This data demonstrates the selective cure of the rubber compound in a laminate when the rubber compounds have been sensitized or desensitized to react to the irradiation treatment. All of the tests were subjected to the double side irradiation treatment except Test 6 which was irradiated on only one side; the side having the higher dosage.

Table V demonstrates the application of this invention in a composite strip wherein the inner layer is cured by irradiation and the two outer layers are uneffected. These laminates were prepared with three layers each containing a solution styrene/butadiene copolymer, as indicated in Table V. Mylar film was placed between each layer to facilitate later separation. The laminates were subjected to a double side irradiation treatment; the layers were then separated and the physical properties determined for each layer.

TABLE V

| | | Gauge (inches) | Dosage (Megarads) | Modulus at 300% Elongation (psi) | Tensile Strength (psi) | Elongation (%) |
|---|---|---|---|---|---|---|
| | Laminate A | | | | | |
| A. | 100 SBR/70CB 40 aromatic oil/2 Santoflex 13 | .021 | 3.8 | 41 | 51 | 800 |
| B. | 100 SBR/50CB/ 2 PDCB | .030 | 3.5 | 258 | 822 | 733 |
| C. | 100 SBR/50CB/ 2 Santoflex 13 | .33 | 3.75 | 143 | 303 | 992 |
| | Laminate B | | | | | |
| A. | 100 SBR/70CB/ 2 Santoflex 13, 40 aromatic oil | .023 | 5.7 | 67 | 107 | 840 |
| B. | 100 SBR/50CB/ 2 PDCB | .034 | 5.4 | 383 | 1391 | 713 |
| C. | 100 SBR/50CB/ 2 Santoflex 13 | .035 | 6 | 196 | 628 | 860 |

This data demonstrates the irradiation cure of the sensitized inner layer of a three layer laminate while the desensitized outer layers are uneffected by the irradiation treatment. The outer layers retain their building tack while the inner layer is hardened and will retain its dimension.

The dosage received by the layers in the above examples was measured by the use of strips of blue cellophane containing methylene blue dye. These strips were applied to the top and bottom of the laminates to be irradiated. Optical density measurements were taken on the strips before and after irradiation. The irradiation reduces the dye to a colorless state with the amount of bleaching being proportional to the irradiation dose received by the strip.

The dose on the strip is determined from a plot of the change in optical density (before and after irradiation) as a function of dose size. The average dosage on a layer is calculated from the surface dose and a previously determined depth-dose distribution curve for the particular electron accelerator being used. A uniform dosage throughout each layer is obtained by a proper selection of the amount of electron energy and the double side dosage technique.

This invention takes maximum advantage of the laminate theory that the greater the number of interfaces, the greater the resistance to flow of the laminate. This invention makes possible laminates containing more layers and thinner layers than previously obtained. The interfaces more evenly distribute the expansion stresses and give the laminate more dimensional stability.

I claim:

1. A pneumatic tire having a laminate as an abrasion gum strip or an innerliner wherein said laminate is comprised of at least two groups of layers with each group having at least one layer and each layer of said laminate comprising a rubber compound having an unsaturated, amorphous polymer selected from the group consisting of natural rubber and synthetic rubber and each layer having sulfur and sulfur cure accelerators so that said layers will vulcanize when exposed to a subsequent vulcanization treatment, said laminate manufactured by the steps comprising providing at least one layer of a first group with a component selected from the group consisting of paradichlorobenzene and the thioetherpolythiols; providing at least one layer of a second group with components selected from the group consisting of 2,6-di-t-butyl-p-cresol; phenyl beta-naphthylamine; 4,4' thiobis (6-t-butyl-m-cresol); N-(1,3-dimethylbutyl) N' phenyl-p-phenylene diamine; syn-di-betanaphthyl-p-phenylene diamine; and aromatic oils; said components yielding different degrees of cross-linkage in said layers when said layers are subjected to irradiation; assembling at least one of said layers from each said group into contiguous relationship to form a laminate; subjecting said laminate to irradiation so that at least two of said layers are cross-linked to a different degree; assembling said laminate into said tire and vulcanizing said tire.

2. The pneumatic tire of claim 1 in which at least one of said layers contains a material which retards cross-linkage when subjected to irradiation and at least one other of said layers contains a material which promotes cross-linkage when subjected to irradiation.

3. The pneumatic tire of claim 1 wherein at least one of said layers varies in thickness across its cross section so that said laminate is contoured to provide more of said variable layer in certain, predefined areas along its width.

4. In the method of manufacturing a pneumatic tire having a laminate as an abasion gum strip or an innerliner wherein said laminate is comprised of at least two groups of layers with each group having at least one layer and each layer of said laminate containing a rubber compound having an unsaturated, amorphous polymer selected from the group consisting of natural rubber and synthetic rubber and each layer of said laminate containing sulfur and sulfur cure accelerators so that said layers will vulcanize when exposed to a subsequent vulcanization treatment; the steps comprising providing at least one layer of a first group with a component selected from the group consisting of paradichlorobenzene and the thioetherpolythiols; providing at least one layer of second group with components selected from the group consisting of 2,6-di-t-butyl-p-cresol; phenyl beta-naphthylamine; 4,4' thiobis (6-t-butyl-m-cresol); N-(1,3-dimethylbutyl)-N' phenyl-p-phenylene diamine; syn-di-betanaphthyl-p-phenylene diamine and aromatic oils; said components yielding different degrees of cross-linkage in said layers when said layers are subjected to irradiation; assembling at least one of said layers from each said group into contiguous relationship to form a laminate; subjecting said laminate to irradiation so that at least two of said layers are cross-linked to a different degree; assembling said laminate into said tire and vulcanizing said tire.

5. The method of claim 4 wherein at least one of said layers contains a material which retards cross-linkage when subjected to irradiation and at least one other of said layers contains a material which promotes cross-linkage when subjected to irradiation.

6. The method of claim 4 wherein at least one of said layers varies in thickness across its cross section so that said laminate is contoured to provide more of said variable layer in certain, predefined areas along its width.

* * * * *

UNITED STATES PATENT OFFICE
CERTIFICATE OF CORRECTION

Patent No. 4,089,360          Dated May 16, 1978

Inventor(s) Georg Gustav Anton Böhm

It is certified that error appears in the above-identified patent and that said Letters Patent are hereby corrected as shown below:

Column 1, line 32, "descreasing" should read --decreasing--;

Column 1, line 42, "compund" should read --compound--;

Column 2, line 68, "laminated" should read --laminate--;

Column 6, line 38, "curves" should read --cures--;

Column 7, line 29, "2985" should read --2895--;

Column 12, line 58, "layer of second" should read --layer of a second--.

Signed and Sealed this

Nineteenth Day of September 1978

[SEAL]

Attest:

RUTH C. MASON
*Attesting Officer*

DONALD W. BANNER
*Commissioner of Patents and Trademarks*